United States Patent [19]

Hackworth

[11] 4,167,936

[45] Sep. 18, 1979

[54] STATIC SOLAR TRACKER AND ENERGY CONVERTER

[76] Inventor: Albert J. Hackworth, 1912 A Pacific Ave., Venice, Calif. 90291

[21] Appl. No.: 822,899

[22] Filed: Aug. 8, 1977

[51] Int. Cl.² .............................................. F24J 3/02
[52] U.S. Cl. ..................................... 126/438; 165/96
[58] Field of Search .............. 126/270, 271; 237/1 A; 165/32, 96; 350/288, 299

[56] References Cited

U.S. PATENT DOCUMENTS

| | | | |
|---|---|---|---|
| 2,949,283 | 8/1960 | Smith | 165/96 |
| 3,273,558 | 9/1966 | Boothe | 126/271 |
| 3,866,285 | 2/1975 | Clark | 126/271 |
| 3,951,128 | 4/1976 | Schoenfelder | 126/271 |
| 3,990,430 | 11/1976 | Robertson | 126/271 |
| 4,000,734 | 1/1977 | Matlock | 126/271 |
| 4,011,855 | 3/1977 | Eshelman | 126/270 |
| 4,027,653 | 6/1977 | Meckler | 126/271 |

*Primary Examiner*—James C. Yeung
*Attorney, Agent, or Firm*—Bruce L. Birchard

[57] ABSTRACT

A fluid-containing tube is supported by a radially-disposed, heat absorbing fin so as to be coaxial with the reflective inner surface of a hemi-cylindrical reflector. Such a combination, if positioned with the reflector aperture substantially horizontal and with a North-South disposition of the reflector axis, or with the reflector aperture vertical, its axis substantially vertical and with a Southern exposure of that aperture, will produce effective sun-tracking and efficient heating of the fluid in the tube throughout the daylight hours even though the reflector remains static.

1 Claim, 5 Drawing Figures

STATIC SOLAR TRACKER AND ENERGY CONVERTER

BACKGROUND OF THE INVENTION

1. Field of the Invention

This invention relates to solar-to-thermal energy converters and more specifically to such converters which effect tracking of the sun to maximize energy conversion.

2. Prior Art

Dynamic sun trackers are well known and rely upon such things as silicon solar cells attached to the solar collector and sensing the sun's position by comparing output voltage or current from the cells and controlling mechanical trackers which adjust the collector's orientation until the output voltages or currents from the solar cells are balanced indicating identical insolation and proper aiming of the collector. Such dynamic trackers are expensive and power consuming.

Static collectors usually have low efficiency except when they face the sun directly, a condition that exists for only a short period of time each day and is optimal only in one predetermined annual season.

A search of the prior art has revealed the following patents and literature; U.S. Pat. Nos. 3,994,279 (Barak), 3,990,914 (Weinstein, Lee), 3,915,128 (Rineer), 3,951,128 (Schoenfelder), 3,321,012 (Hervey).

Sales Brochure entitled "THE HOTLINE FIXED POSITION CONCENTRATING SOLAR COLLECTOR" published by Aerco, 415 North Main, Sigourney, Ia. 52591.

Of this prior art the most pertinent to this invention are the Hervey patent and the Aerco sales brochure. Both of these disclosures fail to show the fluid-carrying tube supported by a heat absorbing fin. Instead, in such prior art the fluid-carrying tube extends down to the surface from which it is supported and the un-insulated portion of the tube, or duct, can and does act as a radiator of the heat stored in the fluid contained within the tube or duct. Such radiation reduces collector and converter efficiency.

It is an object of my invention, therefore, to provide a static sun-tracking solar-thermal energy converter of high efficiency.

It is a further object to provide a highly efficient solar-energy collector which is inexpensive to fabricate and is reliable in its operation.

SUMMARY OF THE INVENTION

Stated succinctly, my invention contemplates a basic solar-to-thermal energy converter comprising a hemi-cylindrical reflector along the axis of which is carried a fluid-containing tube or duct, such tube or duct being supported from the reflector by a radially disposed, flat-blackened, heat-conductive fin, such fin being normal to the plane of the aperture of the associated collector. A plurality of these converters may be combined to meet the associated heating requirement.

If each collector is positioned with its aperture horizontal (or, more accurately, with its aperture tilted south by an angle equal to the latitude of the installation) and its axis in a North-South orientation, or is positioned with its aperture vertical and its axis vertically oriented, solar radiation will fall upon the tube or upon the heat-absorbing fin which is coupled to the tube, from morning until night, despite diurnal and seasonal variations in the sun's position.

BRIEF DESCRIPTION OF THE DRAWINGS

The novel features of my invention are set forth in the appended claims. The manner of operation of my invention can best be understood by referring to the following drawings in which;

DETAILED DESCRIPTION OF THE PREFERRED EMBODIMENTS

Figure 1:
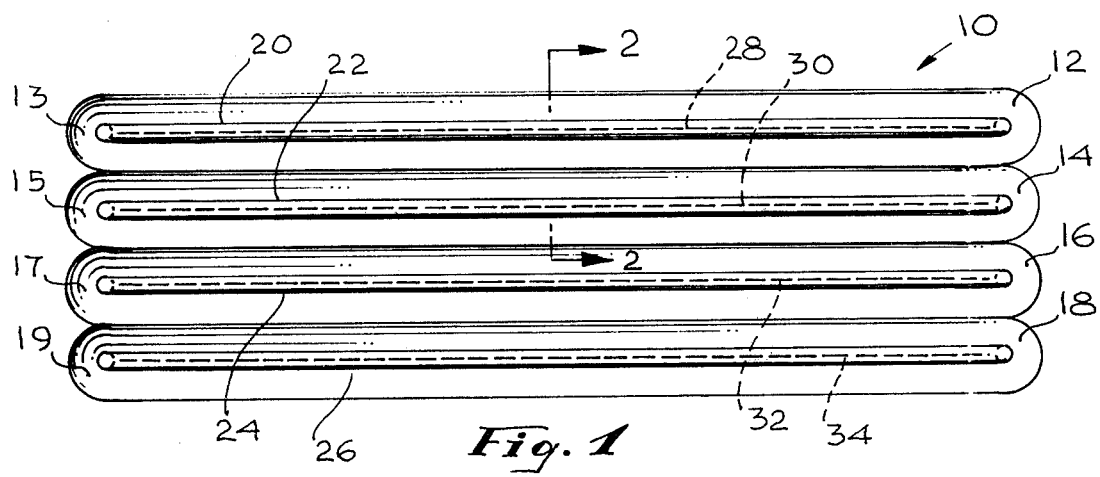
FIG. 1 is an elevational view of a solar-energy converter according to my invention.
Figure 2:
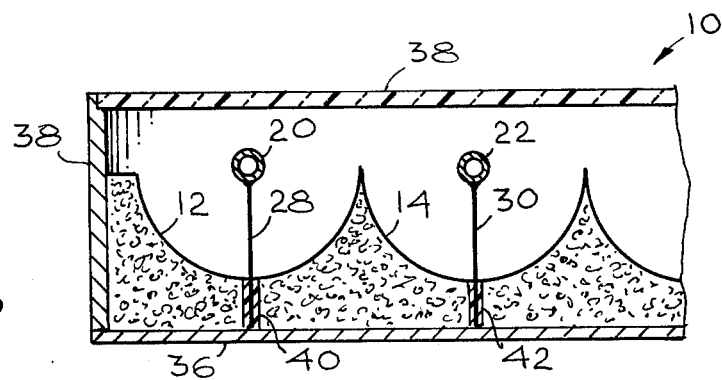
FIG. 2 is a view, partially in section, taken along the line 2—2 in FIG. 1.

In FIG. 1, array 10 includes solar collectors 12, 14, 16 and 18 which are hemi-cylindrical in cross section, as can be seen more clearly in FIG. 2. Tubes 20, 22, 24 and 26 are supported along the axes of their respective collectors by fins 28, 30, 32 and 34, respectively some of which can be seen more clearly in FIG. 2. Tubes 20, 22, 24 and 26 may be connected in parallel, series or in a combination of those configurations.

In FIG. 2, array 10 has housing 36 which may have a transparent top 38 sealed thereon to produce what is known as the "greenhouse" effect within array 10. Further, housing 36 with cover 38 may be made air-tight, permitting partial evacuation of the inner space in array 10, thus accentuating the greenhouse effect because the evacuation produces a condition of heat insulation. The solar radiation entering the array gives up energy to fins 28 and 30 and/or to tubes 20 and 22 and the fluid therein, and the solar radiation is shifted in frequency to very long wave infra-red radiation which cannot escape through cover 38. While cover 38 has been shown as spanning the entire array it may, instead, enclose the collectors individually.

Collectors 12 and 14 are light-reflective in nature and can be either brightly plated metal or aluminized plastic. In either event, they are right-circular semi-cylinders with the center of each circle at the center or average center line of tubes 20 and 22 (and their successors, if any). The end sections, such as sections 13, 15, 17 and 19 may be sections of spheres of the same radius as their respective hemi-cylindrical reflectors. Both ends of collectors may have this shape. Sunlight falls directly upon tubes 20 and 22 and, by reflection from collectors 12 and 14, upon either tubes 20 and 22 or fins 28 and 30, respectively, or both. At times approaching solar noon radiation is reflected on the westerly-solar-position sides of tubes 20 and 22 and fins 28 and 30. At solar noon the solar radiation is reflected by collectors 12 and 14 on, respectively, tubes 20 and 22 and, by reason of spherical aberration, simultaneously upon fins 28 and 30, respectively. In the afternoon the easterly-solar-position sides of tubes 20 and 22 and fins 28 and 30, respectively, will be insolated by reflection from collector 12 and 14.

Expanded plastic foam backs and reflective surfaces of collectors 12 and 14, to limit heat loss by conduction.

Fins 28 and 30, and their successors, if any, are of material exhibiting good heat conduction characteristics, e.g. copper, with the surface of the fins being painted with a flat-black material to assure maximum heat absorption. At their upper ends they are in good conductive contact with their associated heat-transfer tubes 20 and 22, for example.

At their lower ends, fins 28 and 30 are secured, through heat-insulating stand-offs 40 and 42 to base 36 of array 10.

Figure 3A:
FIGS. 3A and 3B are schematic diagrams of alternative forms of a portion of the device of FIG. 1.
Figure 3B:

Tubes 20 and 22 may be of serpentine or coiled configuration, as shown in FIGS. 3A and 3B, respectively, those shapes resulting in a greater column of fluid being subjected to heating at any one time. In both cases the tubes would be supported, at their lower extremities, by fins 28, 30, et seq.

Figure 4:
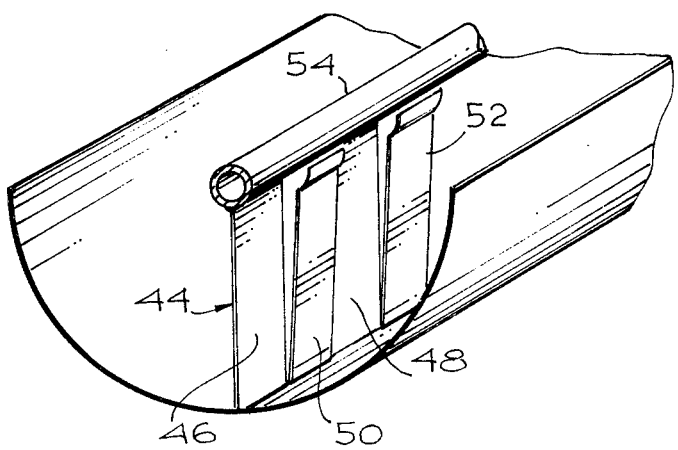
FIG. 4 is an alternative form of a portion of the device of FIG. 1.

When the sun sets or, for other reasons the solar collectors, such as 12 and 14 in FIG. 1, are not insolated, heated fluid flowing through tubes 20 and 22, for example, will lose heat through fins 28 and 30, respectively. Because those fins are good energy absorbers they are also good radiators. To minimize such loss, the configuration of FIG. 4 may be used. In FIG. 4, fin 44 has been segmented into fixed segments 46 and 48 and movable segments 50 and 52. Movable segments 50 and 52 are movable into contact with tube 54 when they are heated by the sun to a predetermined temperature and move out of contact with tube 54 when they are below that temperature. Such movement can be accomplished by making segments 50 and 52 of bi-metallic material such as is used in thermostats so that they automatically bend with temperature, or by pivoting segments 50 and 52 at their bases and driving them with thermally expanding material or bi-metal strips. In either case, segments 50 and 52 move out of contact with tube 54 when they are colder than a predetermined temperature, thus limiting radiation losses from the energy conversion system.

Alternatively, movable segments 50 and 52 may be supported, at their lower ends, by bellows containing a confined gas, such as nitrogen. When the fins are not insolated and, hence, could act as radiators they are supported by the bellows out of contact with tube 54. When the sun is shining the bellows and the gas therein are heated, the gas expands and so do the bellows, causing the fins to move into contact with tube 54 thereby assisting the heating of the fluid flowing through tube 54.

While particular embodiments of this invention have been shown and described it will be apparent to those skilled in the art that variations may be made on what has been disclosed here. It is the intention of the appended claims to cover all such variations.

I claim:

1. A solar-to-thermal energy converter, including:

a base;

a collector supported from said base, said collector having a fixed, reflective, hemi-cylindrical concave surface to form an aperture in which a first axis of said hemi-cylindrical surface lies;

a tube for carrying heat-transfer fluid, said tube having a second axis and an outer wall;

a fin supported mechanically from said base but thermally insulated therefrom, said fin being in heat-conducting contact with said outer wall of said tube along its length and supporting said tube with said second axis coincident with said first axis;

said outer wall of said tube extending above said aperture;

said fin being normal to said aperture when said fin is in heat-conducting contact with said outer wall of said tube;

said fin being segmented to give fixed and movable fin segments, said movable fin segments being responsive to a first predetermined temperature to move into contact with said tube and being responsive to a second predetermined temperature to move away from contact with said tube.

* * * * *